United States Patent [19]
Zeuthen

[11] 4,203,533
[45] May 20, 1980

[54] TONER POWDER SUPPLY SYSTEM

[75] Inventor: Karl G. Zeuthen, Gentofte, Denmark

[73] Assignee: Rex-Rotary International/A.S., Birkerod, Denmark

[21] Appl. No.: 874,393

[22] Filed: Feb. 2, 1978

[30] Foreign Application Priority Data

Apr. 14, 1977 [GB] United Kingdom ............... 15625/77

[51] Int. Cl.$^2$ ............................................. G01F 11/24

[52] U.S. Cl. .................................... 222/241; 222/412; 222/DIG. 1

[58] Field of Search ................................ 222/239-242, 222/260, 327, 336, 412, 413, DIG. 1; 355/3 DD; 118/653

[56] References Cited

U.S. PATENT DOCUMENTS

| | | | |
|---|---|---|---|
| 3,576,280 | 4/1971 | Ahmann et al. | 222/DIG. 1 X |
| 3,618,867 | 11/1971 | Berlier et al. | 222/DIG. 1 X |
| 3,954,331 | 5/1976 | Smith | 355/3 DD |

FOREIGN PATENT DOCUMENTS

| | | | |
|---|---|---|---|
| 6332 | of 1914 | United Kingdom | 222/411 |
| 394945 | 9/1931 | United Kingdom . | |
| 1129213 | 10/1968 | United Kingdom | 222/DIG. 1 X |

OTHER PUBLICATIONS

Caudill, A. H., *Variable Quantity Toner Replenisher*-IBM Technical Disclosure Bulletin, 17(12): pp. 3516-3517, May, 1975.

*Primary Examiner*—Robert J. Spar
*Assistant Examiner*—Fred A. Silverberg
*Attorney, Agent, or Firm*—Fleit & Jacobson

[57] ABSTRACT

The invention relates to a toner replenishment system for a dry toner developer unit in a photocopier. Toner is introduced into the developer unit in a canister which is closed at one end and has near its other end an extractor plate mounted for rotation around the axis of the canister and for axial movement along the canister, the toner powder being disposed between the closed end and the extractor plate. This canister can be simply loaded into a developer unit and then, during operation of the developer unit, toner demand is met at a metered rate by rotation of the extractor plate causing an extractor blade to slice toner and transfer it through the extractor plate to the axially outer side thereof for subsequent conveyance to the developer hopper. The toner extractor member is driven by a drive rotor activated by a differential screw mechanism having at least one of the shafts of the screw members resilient to allow the drive shafts to spring apart for automatically releasing the canister on depletion of the canister contents.

22 Claims, 8 Drawing Figures

TONER POWDER SUPPLY SYSTEM

The present invention relates to the loading of the developer hopper of an electrostatographic copier with powdered toner from a supply container.

In electrostatographic copiers, it has been common for the thermoplastic toner powder to be supplied in a container such as a plastics bottle with a sealed cover which has to be removed before the container can be inverted to pour the toner powder into the hopper of the copying machine.

It has previously been proposed to provide some means for metering the rate at which toner is supplied from such a container, by driving a dispensing valve, fed by gravity from the container, to allow toner powder from the inverted bottle to pass at a controlled rate, or in discrete controlled doses, into the hopper. In one such system, disclosed in U.S. Pat. No. 3,954,331 the toner bottle is attached to a pivotable hopper lid while the bottle is in its upright configuration and the arrangement may be such that no toner is allowed to be discharged during inversion of the toner bottle into its "in use" position.

British Patent Specification No. 1,129,213 (E.G.E.—Elektrostatik und Chemische Entwicklungsgesellschaft M.B.H.) discloses another system in which the toner powder is metered from a receiving container to a toner storage vessel at a controlled rate, by way of an apertured rotor plate in the floor of the receiving container, to maintain the ratio of toner powder to carrier bodies, in this case iron filings, at a desired value.

Furthermore, U.S. Pat. No. 3,618,867 (Besher et al) proposes replenishing a copier with a cake of toner from which powder is to be scraped off at a controlled rate.

According to one aspect of the present invention we provide a cylindrical canister including a closed end wall; an opposite openable end; an extractor member mounted within the canister and able to rotate freely about the longitudinal axis of the canister and to execute, independently of its rotation, a translational movement along the canister from said openable end to said closed end; a mass of thermoplastic fusible toner material between said extractor member and said closed end; an extractor blade carried by said extraction member to sweep said mass of toner during rotation of the extractor member; and abutment means on said extractor member for engaging a drive member dimensioned to fit into the open end of the canister.

It is an object of this invention to provide a toner supply system in which the toner powder is introduced into the developer unit at a controlled rate from a disposable canister which is sealed up to the instant of loading into the developer unit and even thereafter holds the toner powder in a substantially closed zone to maintain the powder of homogeneous consistency.

It is a further object of the invention to provide a system in which supply of the powder from the canister will occur under positive extraction rather than purely gravity feed from a bottle to a dosing valve, thereby enabling the rate of powder consumption to be controlled and the powder container more easily rendered leakproof.

Such a canister may quite simply be inserted in a suitably formed cylindrical recess of a machine such as a developer unit of an electrostatographic copier after removal of the end closure from the non-permanently closed end of the canister. The circular plate forming the extractor will serve as a secondary closure to guard against spilling of powder while the container is manipulated into position in the developer unit or other machine into which the powder from the container is to be dispensed.

According to another aspect of the present invention we provide a dry toner developer unit in a photocopier, comprising a cylindrical drive rotor for engaging a rotatable toner extractor member and drivable for rotation about an axis and for movement along said axis; said drive rotor including a screw flight on its exterior of said drive rotor and abutment means on one of its ends to drive such a toner extractor member for rotation around, and for axial movement along, said axis; and means for supporting a cylindrical toner-bearing canister in a stationary position coaxially around said drive rotor.

The powder may be in loose pulverulent form, or in caked form.

Another aspect of the present invention provides a dry toner developer unit for a photocopier, and including a toner metering device comprising means for supporting a cylindrical canister for removal of toner therefrom; and means for rotating an extractor member in such a canister; wherein the means for rotating the extractor member in the canister includes a rotary body mounted coaxially of the canister for movement therealong; and wherein the rotor is driven by a differential thread mechanism formed on intermeshing rotors, of which at least one rotor is mounted on a flexurally resilient shaft to permit separation of the intermeshing threads at the end of travel of the first-mentioned rotor which drives the canister extractor member.

In order that the present invention may more readily be understood the following description is given, merely by way of example, reference being made to the accompanying drawings in which.

Figure 4:
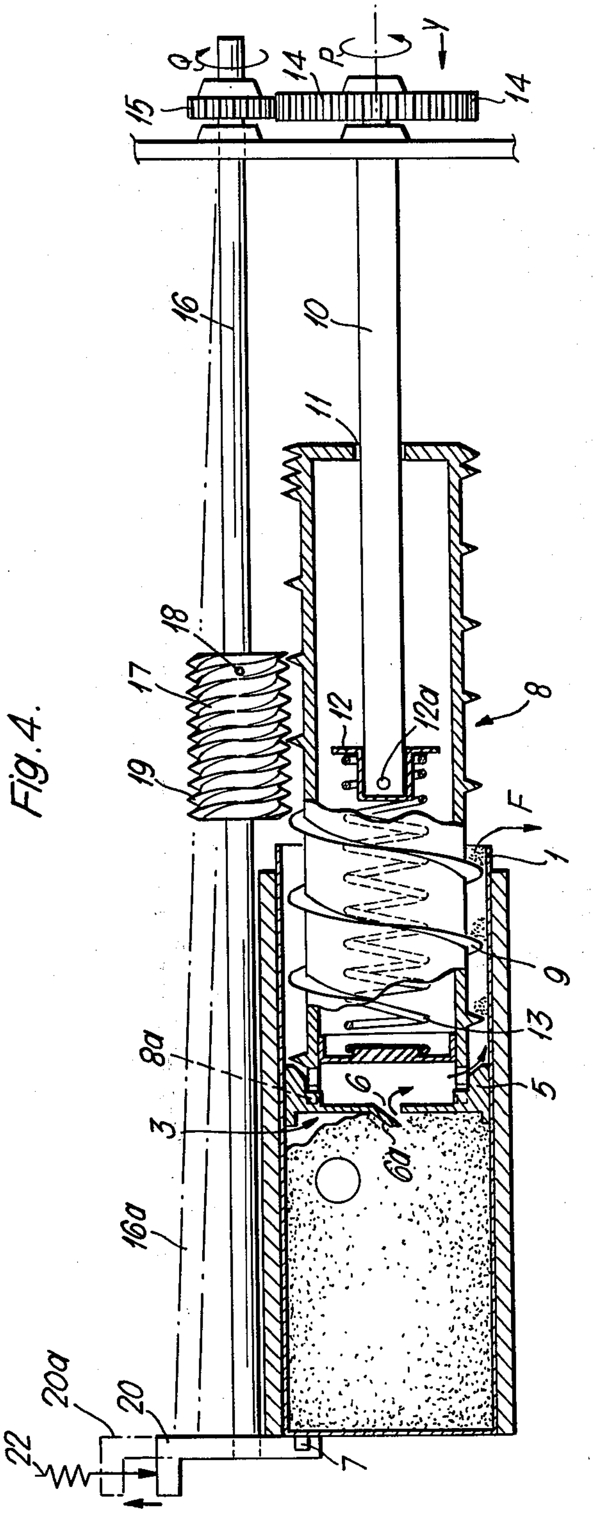
FIG. 4 is a side elevational, partly sectional, view of a developer unit of an electrostatographic copier using the toner supply canister of FIG. 1, and illustrating in particular the drive mechanism for the extractor plate.
Figure 5:
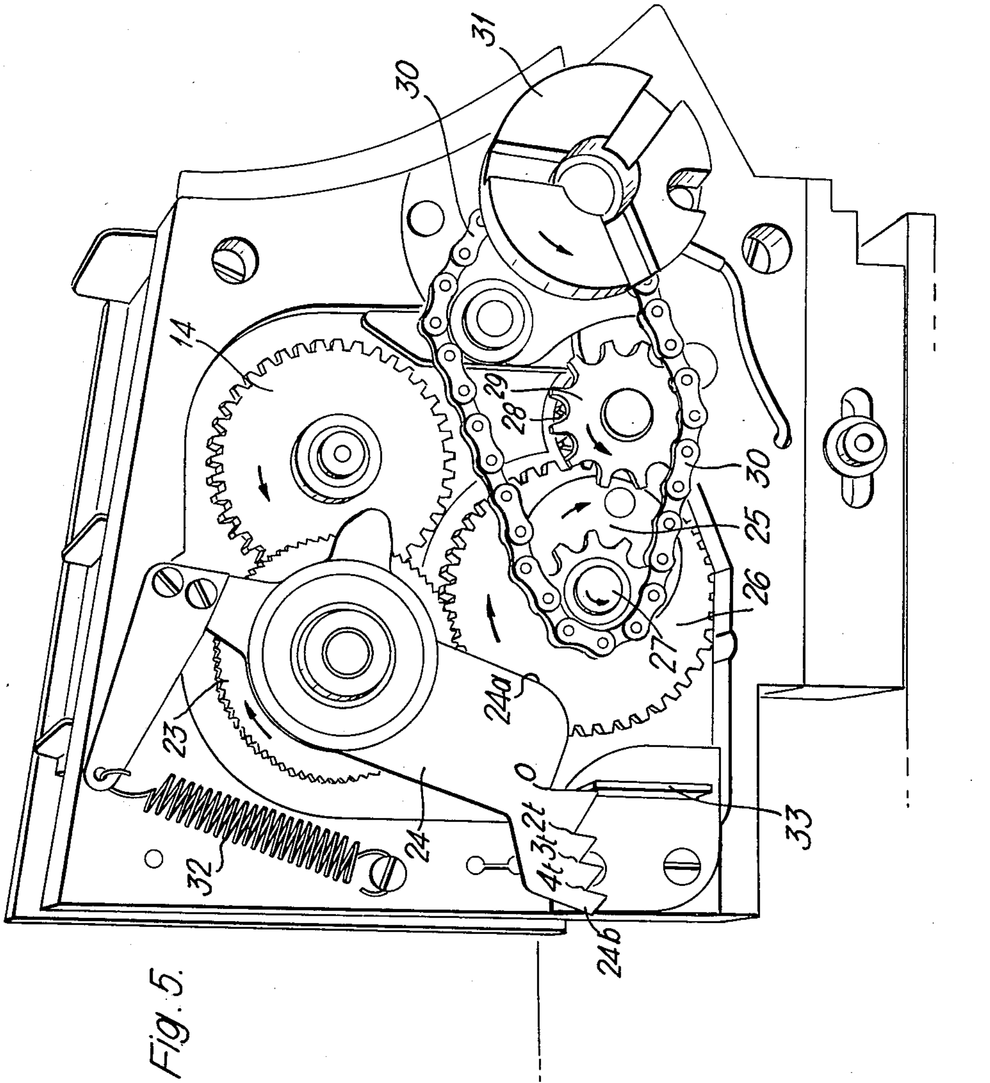
FIG. 5 is a perspective view of one end of the developer unit illustrated schematically in FIG. 4 and showing the drive mechanism to the two drive shafts of the differential screw toner extractor system.
Figure 6:
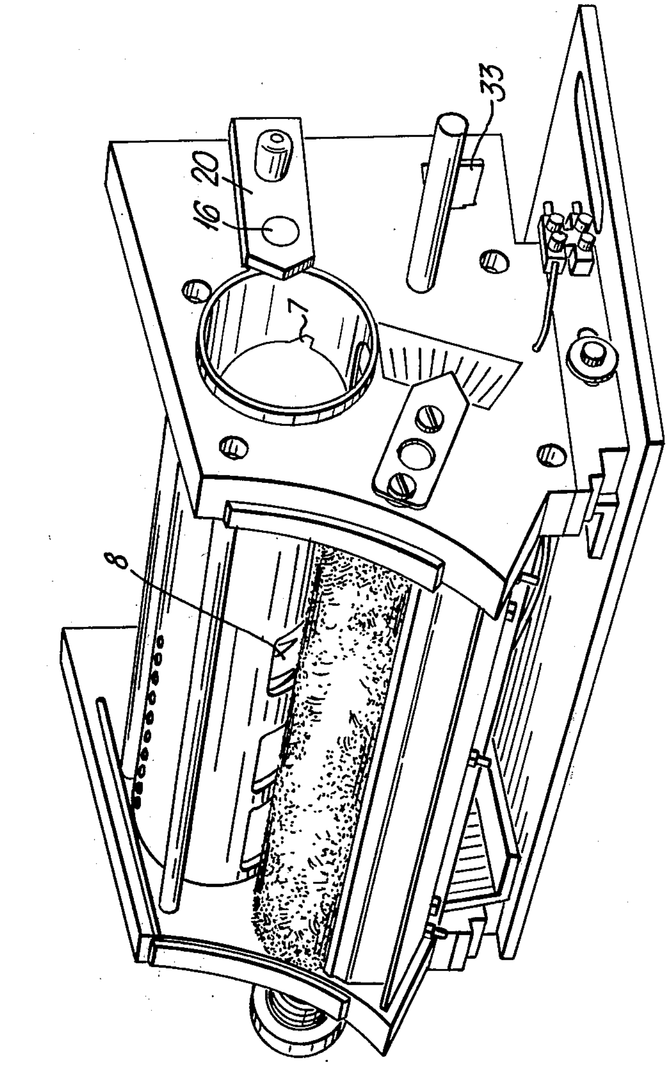
Figure 7:
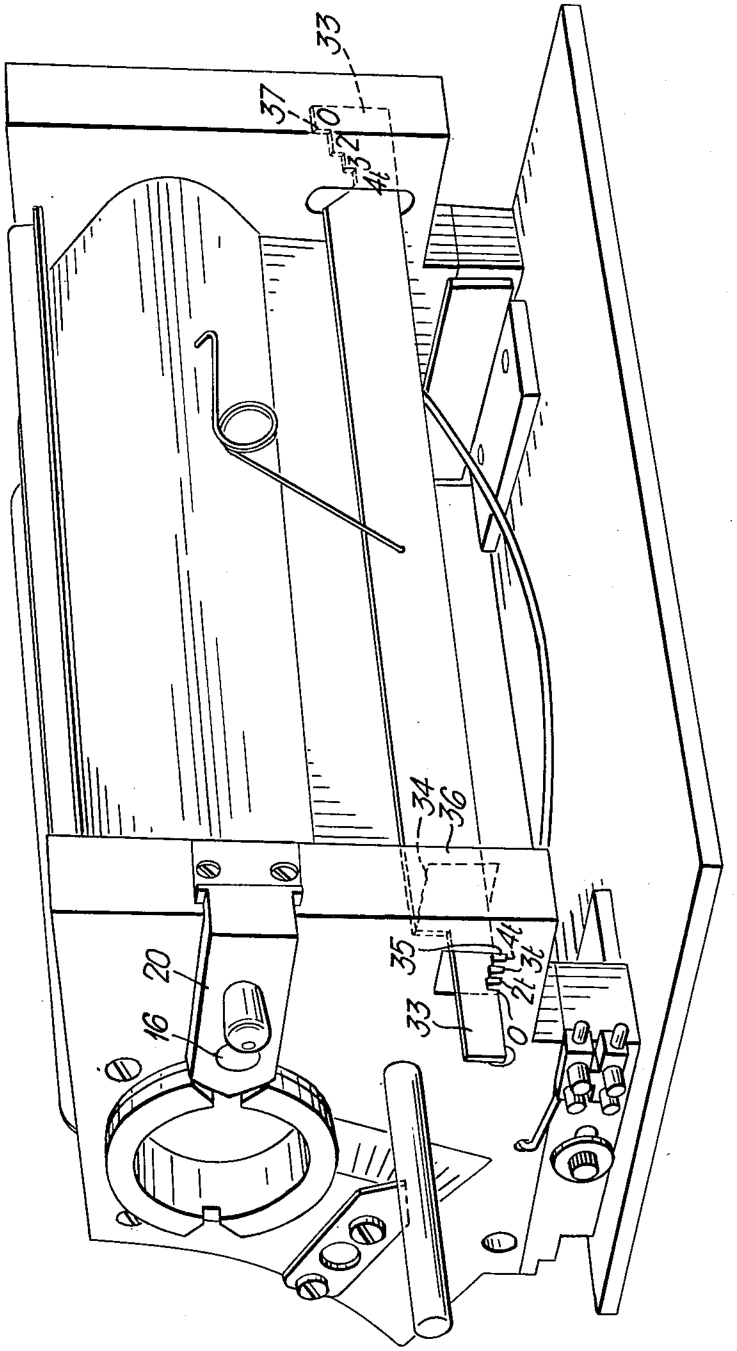

FIG. 6 is a perspective view showing the opposite end of the developer unit, viewed partly from the side and partly from the front of the developer unit, and illustrating the canister separator from the developer unit, with the extractor plate removed from the canister, and showing also the drive member for the canister extractor plate; and FIG. 7 is an end perspective view of the developer unit of FIGS. 4 to 6, looking partly from the side shown in FIG. 6 and partly from the rear, and illustrating in particular the toner supply rate varying mechanism.

Figure 1:
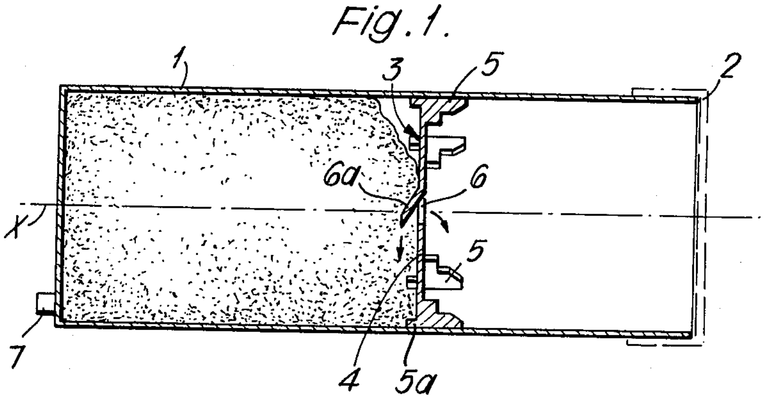
FIG. 1 is a sectional, partly schematic, view of a toner powder supply canister in accordance with the present invention.

The canister illustrated in FIG. 1 is exemplified as being used with a developer unit of the magnetic brush type, illustrated in FIGS. 4 to 6, although of course it will be appreciated that the same design of canister can be used in other types of developer unit.

As illustrated in FIG. 1, the canister 1 is in the form of a cylindrical body having a closed wall at one end and arranged to be closed temporarily by means of a cover 2 illustrated in broken lines at the right-hand side of FIG. 1. In this case the cover 2 is simply in the form of a plastics cup, although some other sealing system, for example any rupturable type of metal foil seal may be incorporated in place of the canister 1 if desired.

An extractor member in the form of a circular plate 3 is incorporated in the canister as part of the container and comprises a disc portion 4 having a diameter substantially equal to the internal diameter of the wall of canister 1, and radially inwardly extending webs 5 to serve as drive teeth for engaging the suitably arranged drive dogs of a drive member (to be described with reference to FIG. 4).

The extractor plate 3 is held perpendicular to the axis X of the canister by means of the radially outer edges of the teeth 5, which conform to the cylindrical inner surface of the canister 1.

In use of the canister 1, the extractor plate 3 is driven to rotate about the axis X of the canister while at the same time progressing gradually along the canister in a leftward direction so that a cutter blade **6*a* adjacent a radially extending extractor slot 6 will slice away a sliver of the toner mass within the canister, allowing that sliced away toner powder to pass through the extractor slot 6 and then fall onto the floor of the canister on the right-hand side of the extractor plate 3. This positive extraction mechanism will work equally well if the toner powder is loosely held within the container 1** as it will if the toner powder is caked in the container, and this provides a considerable advantage over known toner extraction systems since any tendency for the toner supply to cake-up inadvertently inside the bottle has in the past led to difficulty in removing all the toner from the bottle and has required the need for agitation of the bottle during charging of the developer unit, often leading to clouds of toner particles being dispersed into the atmosphere and contaminating the copier and leading to background smutting on the finished copy.

At the left-hand end of the canister 1 projecting axially from a point near the periphery of its closed end wall, is a peg 7 which engages with a suitable retainer bracket of the developer unit (see bracket 20 in FIG. 4) to hold the canister against rotation while the extractor plate 3 is being driven for its rotating and advancing travel along the canister during an extraction step.

Since the canister 1 comes complete with its own extractor plate 3 and its removable cover 2, there is no possibility of the toner powder within the canister being spilt during transport. In any case, it is envisaged that the canister would normally be transported in an upright configuration with the cap 2 at its upper end.

Also, by making each canister complete with its own extractor plate 3 it is possible to ensure that there is virtually no chance of toner becoming caked up on the radially outer surfaces of the extractor plate 3 over a prolonged period, as might be the case if the developer unit has the extractor member and the same extractor plate would then, over a prolonged period, be re-used several times. Because the disposable canister has the extractor plate 3, each plate 3 is used only once and thus the likelihood of caking is reduced. Of course, the fact that the extractor plate 3 executes a mainly rotational movement will assist in wiping clean the periphery of the extractor plate.

When it is desired to load the canister 1 into the developer unit, it is a simple matter to remove the end cap 2 after which the extractor plate 3 still serves as a secondary closure as the only possibility for escape of the toner powder from within the canister is by way of the extraction slot or slots 6; if the toner is indeed caked in the canister 1 then even this escape is most unlikely.

The canister 1 is slid axially into a cylindrical recess therefor such that the drive teeth 5 of the extractor plate 3 engage with the drive dog (**8*a* in FIG. 4) of a drive member 8 in the developer unit and the disc portion 4 of the extractor plate 3 becomes lightly axially pressed against the mass of toner within the canister 1. At this stage a spring detent latch member (20 in FIG. 4) is engaged behind the closed end wall of the canister 1 and will hold the canister in place, thereby resisting any tendency for ejection of the canister during axial travel of the extractor plate 3** in its leftward direction during extraction.

At the end of an extraction phase, the extractor blade **6*a* will abut the inner face of the flat left-hand end wall of the canister 1, and will in effect have removed all the toner powder from the canister 1. The spring detent latch member 20** can then be drawn aside to allow ejection of the canister.

Figure 2:
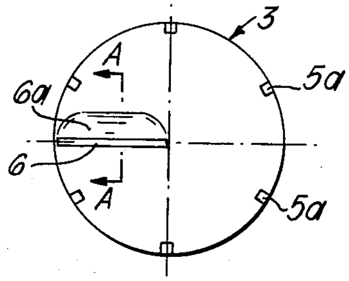
FIG. 2 is an end elevational view of the extractor plate shown in FIG. 1.

FIG. 2 shows an arrangement in which the disc portion 4 of the extractor plate 3 includes only one cutting blade **6*a* and extractor slot 6**.

Figure 3:
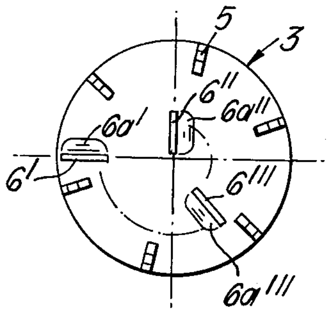
FIG. 3 is an end elevational view, similar to FIG. 2, but showing an alternative form of extractor plate.

An alternative embodiment, shown in FIG. 3 includes three separate equiangularly spaced extractor slots 6', 6'' and 6''', each of which has its own cutting blade and sweeps a respective annular region of the toner mass, the intermediate region swept by slot 6''' overlapping with the regions swept by the outer and inner slots 6' and 6''.

As the extractor plate 3 rotates, the radially outer edges of the teeth 5 sweep the inner cylindrical surface of the canister wall to ensure that toner powder which may work its way between the wall of the canister 1 and the periphery of the plate 4 will be cleared from the wall by the teeth edges while these same edges are serving as guide means to hold the plate 4 in a configuration of perpendicularity with respect to the axis X. This anti-clogging action is further assisted by the smaller teeth **5*a* which project to the left of the disc portion 4 of plate 3** to sweep toner powder away from the disc periphery. Without this clearing of toner powder there would be a tendency for the thermoplastic powder to coalesce and to adhere to the canister wall, thereby hindering smooth rotation and translation of the extractor plate.

Although only three drive teeth 5 would be needed for exerting a symmetrical driving action it is preferred that more than three equiangularly spaced such teeth be arranged around the periphery of the extractor plate. The provision of six such teeth is particularly preferred, each such tooth being associated with a respective smaller tooth 5.

Referring now to FIG. 4, there can be seen, in elevational view, the part of the developer unit incorporating the drive mechanism for the toner feed.

The drive member generally designated 8 is able to be received within the open end of the canister 1 and has at its end the drive dog **8*a* for engagement with one of the above-mentioned drive teeth 5 of the extractor plate 3 of the canister 1**.

Figure 2A:
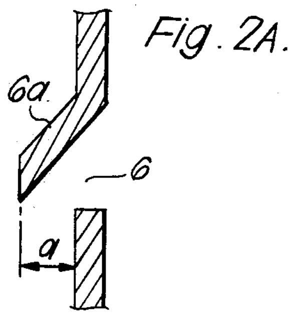
FIG. 2A is a detailed section taken on the line A—A of FIG. 2.

As shown in FIG. 4, the drive member 8 rotates in the anti-clockwise sense, as viewed along the direction of the arrow Y, to drive the extractor plate 3 in the same sense, thereby slicing the right-hand end of the mass of toner powder in the canister causing the sliced powder to pass through the extractor slots 6 (FIGS. 1 and 2A) while at the same time driving a helical flight 9 formed on the cylindrical surface of the drive member 8 in such a direction as to extract any toner which has fallen onto the floor of the canister 1 after passing through the extractor slot 6, thereby feeding the toner rightwardly along the canister to its open end and then falling downwardly in the direction of arrow F.

The right-hand end of the drive member 8, as illustrated in FIG. 4, includes four additional thread starts of the flight 9 so that there are in all five threads at the right-hand end, covering an axial extent of approximately 10 mm. Four of these threads are omitted in the central and left-hand parts of the drive member, so as to enhance the screw conveying effect of the single remaining flight 9 which extends along those parts of the drive member.

Rotary drive to the drive member 8 is imparted by way of a square section driven shaft 10 fitting slidably in the square section recess 11 at the right-hand end of the drive member 8 and carrying, at its end, a top hat-shaped cap 12 forming an abutment for the right-hand end of a helical compression spring 13 whose left-hand end engages a suitably formed seating in the extractor plate 3. This spring 13 is deliberately chosen to be weak enough to allow the majority of the leftward biasing effort on the drive member 8 to be derived from the threaded engagement with a driving member 17 to be described in greater detail below, although it will of course ensure that each time a fresh canister 1 is inserted in the machine the compression spring 13 will cause the drive member to seek a position in which its drive dog 8a is in engagement with the drive teeth 5 of the extractor plate 3.

Clearly therefore, as the square section shaft 10 rotates in the direction of arrow P it will cause simultaneous rotation of the drive member 8 in the same direction, and at the same speed, although the drive member 8 will be free for axial sliding movement, initially under the effort of the compression spring 13, and subsequently by virtue of the threaded engagement with the driving member 17 to be described below.

The right-hand end of the square section driven shaft 10 carries a pinion 14 in constant meshing engagement with a smaller pinion 15 carried by a driving shaft 16 on which the above-mentioned driving member 17 is pinned at 18.

As shown by the arrow Q in FIG. 4, the shafts 10 and 16 rotate in opposite senses due to the constant meshing of the pinions 14 and 15.

The driving member 17 carries a two-start thread 19 having a pitch different from that of each of the flights 9 of the drive member 8 but such that the two starts of the thread 19 of the driving member 17 can engage, in firm threading engagement substantially without lost motion, between any two of the five starts of thread 9 at the right-hand end of the drive member 8, or for that matter that the sole thread start 9 near the centre of the drive member 8 can engage between any two of the thread starts 19 of the driving member 17. Bearing in mind that there are two thread starts of the driving member 17 and five thread starts on the drive member 8, the pitch of the threads 19 on driving member 17 must be smaller than the pitch of each of the thread starts 9 on the drive member 8 by a factor of 2:5 in order to ensure meshing engagement. In this particular example the pitch of each thread start 9 of drive member 8 is 23.9 mm., and hence the pitch of each of the thread starts 19 is 9.57 mm.

If the ratio of the number of teeth of pinion 15 to the number of teeth on pinion 14 were exactly in the same proportion, namely 2:5, there would of course be no movement of the drive member 8 along its drive shaft 10, bearing in mind that the direction of rotation of shaft 16 is opposite to that of shaft 10 and that likewise the handing of threads 19 (in the case right-hand) is opposite to that of threads 9, in this case left-hand. In order to give rise to a resultant movement of the drive member 8 along its drive shaft 10, the ratio of the sizes of pinions 14 and 15 is just very slightly different from 2:5. In this case, the pinion 15 has 20 teeth and the pinion 14 shas 49 teeth (rather than 50 teeth which would have given no resulting movement).

As a result, during each revolution of shaft 10 in the direction P the mismatch of the axial progression of the threads 8 and 9 will be a factor of 1/49 of the pitch (23.9 mm. in this case) of the thread 9. As a result one revolution of shaft 10 will cause an axial progression, in this case of 0.49 mm., of the drive member 8 along the shaft 10.

Leftward motion of the drive member 8 proceeds until the extractor plate 3 is in engagement with the extreme left-hand end wall of the canister 1 before which time all five starts of thread 9 on the drive member 8 will have begun to engage the threads 19 of the driving member 17. As the extractor plate 3 abuts the left-hand end wall, the entire supply of toner within the canister 1 will of course have been depleted and the threads 8 and 9 just disengage in that the right-hand end of the threaded exterior of the drive member 8 is positioned just beyond the left-hand end of the threaded exterior of driving member 17 so drive to the extractor plate 3 is arrested. Further rotation of the drive shaft 10 and drive member 8 is possible but will serve only to withdraw from the canister 1 toner particles which have already passed through the extractor slot 6. A switch, not shown, responsive to the position of the drive member 8 signals "Toner Depletion", for example by lighting an indicator lamp, alerting the operator of the need to substitute a fresh canister 1.

Throughout normal use of the toner supply system, the L-shaped detent catch bracket 20 is abutted by the catch-tooth 7 to prevent rotation of the canister 1. To allow removal of the depleted canister 1 this bracket 20 is pulled by the operator in the direction of arrow R, to the chain dotted line position 20a to release the canister and to pull the shaft 16 aside into its alternative position 16a to allow the drive member 8 to be urged rightwardly upon insertion of a fresh full or partly full canister 1.

Inadvertent release of the canister 1 by movement of the bracket 20 is resisted by the action of a compression spring 22 schematically illustrated in FIG. 4.

In order to allow this lateral movement of the secondary shaft 16 and the driving member 17 the shaft 16 will be flexurally resilient and/or loosely mounted in its bearings so that the shaft 16 will be free to swing away from the full line position of FIG. 4, into the dotted line position 16a. If necessary there may also be some form of flexure-permitting means incorporated in the shaft 16, for example a resilient coupling or a universal joint.

The drive member 8 will of course be prevented from springing right off the end of its drive shaft 10, by virtue of the top hat-shaped cap 12 pinned at 12*a* and hence trapping the drive member against withdrawal. The left-hand end of the drive member 8, including the drive dog 8*a* constitutes a drive means for the extractor plate 3 while the remainder of the member 8 and the screw flights 9 constitutes a conveyor screw for feeding toner.

The drive transmission to the shaft 16 includes a means for varying the rate of rotation of the shaft 16, in terms of varying the incremental rotation per copy cycle of the electrostatographic copier machine in which the particular developer mechanism is incorporated.

For this purpose, the shaft 16 is driven by means of a drive system illustrated in more detail in FIG. 5 where the pinion 14 of shaft 10 is visible but the pinion 15 of shaft 16 is concealed behind a ratchet wheel 23. It will of course be appreciated that FIG. 4 is an underneath plan view of the arrangement illustrated in FIG. 5.

The ratchet wheel 23 is driven by a pawl (not shown) on a pawl carrier 24 which is driven by engagement with an eccentric projection 25 on a pinion 26 on an idler shaft 27. The pinion 26 is in turn driven by a smaller pinion 28 fast with a chain sprocket 29 over which a chain 30 passes, the chain 30 being driven from the shaft of the magnetic developer brush, by means of a quick release coupling member 31 on the end of the developer brush shaft and engageable with a suitable co-operating coupling member (not shown) forming part of the copier as a whole rather than the developer unit and adapted to mate with member 31 as the developer unit is slid into position on the copier.

The pawl carrier 24 is urged for clockwise rotation each time the eccentric 25 strikes an abutment surface 24*a* of the pawl carrier and is spring urged, by means of a helical tension spring 32, for anti-clockwise return direction while the pawl (not shown) slides over the inclined saw-teeth of the ratchet wheel 23. The ratchet wheel 23 is thus driven in the clockwise direction, as indicated by the arrow on FIG. 5, and by virtue of its being fast with the pinion 15 (FIG. 4) this will result in anti-clockwise rotation of the pinion 14 meshing with pinion 15.

To facilitate varying the stroke of the pawl carrier 24, a jagged extension 24*b* of the pawl carrier has four teeth each of which is capable of coming into engagement with a stepped, slidable adjuster plate 33.

When the first tooth (marked 0) is able to abut the highest of the steps (37 in FIG. 7) of the adjuster plate 33 (in the position of the adjuster plate when it is inserted to its greatest extent—i.e. it is in a position furthest away from the observer in FIG. 5), the wing 24*a* of the pawl carrier 24 will be held just clear of the orbit of the eccentric 25. The next tooth, marked "2*t*" in FIG. 5, is, during rotary oscillation of the pawl carrier 24, able to contact the second highest step 37 of the adjuster plate 33 and will allow the pawl carrier 24 to oscillate through an angular distance equivalent to two of the teeth on the ratchet wheel 23. Similarly, the next two teeth of jagged extension 24*b* marked "3*t*" and "4*t*", respectively, correspond to the third and fourth highest steps 37 of the plate 33, respectively, and allow an amplitude of oscillation of the pawl equivalent to three and four, respectively, of the teeth of the ratchet wheel 23. Naturally, during oscillation of the pawl carrier 24 the ratchet wheel 23 will only rotate while the pawl carrier is moving in the clockwise direction.

In order to vary the position of the adjuster plate 33, there is a suitable set of four notches formed at the opposite end of the developer unit (see FIG. 7) and a set of steps 34, schematically illustrated in FIG. 7, formed on the developer housing. This provides a rugged manual adjustment facility for test work on the developer in that the method of setting the plate 33 requires merely pushing the plate rightwardly, as viewed in FIG. 7, and then moving the end exposed in FIG. 7 laterally to insert it in the correct one of the four notches 35 in the housing wall; pulling the plate leftwardly again will bring the end wall 36 of the plate 33 into abutment with the appropriate one of the steps 34 on the housing. As can be seen clearly in FIG. 7, each of the notches marked 0, 2*t*, 3*t* and 4*t* corresponds to a different one of the steps 34 and will bring a respective one of the steps 37 at the opposite end of the plate 33 into position to be engaged by the teeth of the jagged end 24*b* of the pawl carrier.

In practice, a more sophisticated adjustment mechanism may be provided for changing the incremental rotation of the drive member 8, and consequently for changing the amount of toner dispensed into the developer unit per copy cycle.

An operator-controlled means for varying the toner applied during any copy cycle is well known in conventional electrostatographic copying machines. The difference in the system proposed according to the present invention is that the variation is effected at the point of feed of the toner into the hopper, rather than at the point of dispensing the toner from the magnetic brush or other developer means.

If desired means may be incorporated responsive to the rate of consumption of toner at the developer brush, for automatically varying the travel of the pawl carrier 24.

I claim:

1. In a dry toner developer unit in a photocopier, for metering toner from a toner supply container, the improvement wherein said supply container is a cylindrical canister and has a toner extractor member axially movably and rotatably mounted therein; and wherein said developer unit further includes:

(a) a cylindrical drive rotor;

(b) means driving said drive rotor for rotation about an axis and for movement along said axis;

(c) a screw flight on the exterior of said drive rotor;

(d) abutment means on one end of the drive rotor for drivably engaging the toner extractor member of said canister to drive it for rotation around, and for axial movement along, said axis;

(e) and means for holding said canister against rotation coaxially around said axis of the drive rotor.

2. A developer unit according to claim 1, wherein said screw flight extends along the full axial extent of said cylindrical drive rotor; and further including, at the end of said cylindrical drive rotor opposite said one end, shorter additional screw flights having the same pitch as, and arranged in multi-sart configuration with, the first-mentioned screw-flight.

3. A developer unit according to claim 1 and including a square section drive shaft coaxially around which said cylindrical drive rotor is mounted so as to be slidable therealong but constrained against rotation relative to the shaft, and spring means biasing said cylindrical drive rotor for movement along said drive shaft in a direction driving said drive rotor into the canister.

4. A developer unit according to claim 1, wherein said abutment means on the end of said drive rotor comprise drive dog means in said one end of said drive rotor.

5. A developer unit according to claim 4, wherein said drive dog means comprise six equiangularly spaced drive dogs on said rotor.

6. A developer unit according to any one of claims 1 to 5, and including differential screw means driving said cylindrical drive rotor to execute a rotational movement simultaneously with progressive axial movement in a direction advancing said drive rotor into said canister, said rotation being directed in the appropriate sense to rotate said screw-flight for drawing toner in the canister out of the canister.

7. In a dry toner developer unit for a photocopier and including a toner metering device for releasing toner powder at a controlled rate from a container, the improvement wherein said toner container is a cylindrical canister including a rotatable and axially movable extractor member therein, and wherein said developer unit includes (a) means for holding the cylindrical canister against rotation during rotation of said extractor member for removal of toner from said canister; and (b) means for rotating said extractor member in said canister, said means for rotating the extractor member in the canister including a rotary body mounted coaxially of the canister for movement therealong; differential thread screw means for driving said rotary body along said canister and for rotating said rotary body, said differential thread screw means including a rotor alongside said rotary body, first and second intermeshing threads on said rotor and said rotary body, and flexurally resilient shaft means supporting one of said rotor and said rotary body to permit separation of the intermeshing threads.

8. A developer unit according to claim 7, wherein said rotary body has a cylindrical form, and said first intermeshing thread comprises a continuous external screw flight extending along the cylindrical surface of said rotary body; wherein the said rotor is also of cylindrical form and said second intermeshing thread comprises a screw thread on the external periphery of said rotor and having a pitch which is finer than that of said screw flight on said rotary body and is of opposite hand to said screw flight; wherein said rotor is fixedly mounted on said flexurally resilient shaft means so as to be fixed against rotation and axial movement with respect thereto, and including a second shaft on which said rotary body is slidably mounted for axial movement therealong but is constrained against rotation with respect thereto; and wherein said flexurally resilient shaft means and said second shaft further including intermeshing gears linking them for conjoint rotation in opposite senses and with different speeds of rotation.

9. A developer unit according to claim 8, wherein said means for holding said canister against rotation in the developer unit includes a latch member mounted for sliding movement in the radial direction with respect to the axis of rotation of said rotary body, an end bearing for one end of said flexurally resilient shaft means being carried by said latch member, whereby withdrawal of said latch member to release a canister previously held by said holding means and to allow insertion of a fresh canister will cause the said screw thread and said screw flight to separate from one another to allow said rotary body to be entrained for axial movement with the inserted fresh canister for resetting said rotary body before metering of toner from said fresh canister.

10. A developer unit according to claim 8, wherein said second shaft has a square cross-section and said rotary body includes a transversely extending wall and means in said wall defining a correspondingly formed square aperture for constraining the rotary body for rotation simultaneously with said second shaft.

11. A developer unit according to claim 8, 9 or 10 wherein said screw flight extends the full length of said rotary body, and, wherein at its end which is remote from said means for supporting the cylindrical canister, said rotary body includes additional screw flights of shorter axial extent than, and arranged in multi-start relationship with, the first-mentioned screw flight.

12. A developer unit according to any one of claims 7 to 10 and including drive means for driving said rotor in step-wise manner, said drive means including means for varying the magnitude of each rotation step.

13. In or for a dry toner electrostatic image developer unit a toner supply container comprising (a) a cylindrical canister which has a closed end wall; and an open end opposite said closed end wall;

(b) an extractor member mounted within the canister and able to rotate freely about the longitudinal axis of the canister and to execute, independently of its rotation, a translational movement along the canister from said open end to said closed end;

(c) a mass of thermoplastic fusible toner material between said extractor member and said closed end;

(d) an extractor blade carried by said extractor member to sweep said mass of toner during rotation of the extractor member; and (e) abutment means positioned on and spaced from the center of said extractor member for engaging correspondingly positioned drive dog means of a rotary drive member inserted in the open end of the canister.

14. A toner supply container according to claim 13, wherein there are several of said extractor blades, each extending radially along a respective one of a set of equiangularly disposed radii, and each arranged to sweep, during rotation of said extractor member, a respective one of a set of annular zones of different radial extent throughout said canister.

15. A toner supply container according to claim 14, wherein there are three such extractor blades each covering one of three different annular zones which overlap one another in the radial direction.

16. A toner supply container according to any one of preceding claims 13 to 15, and including an external projection at said closed end of the canister for engaging a latch member of said developer unit in which the canister is to be fitted.

17. A toner supply container according to any one of claims 13 to 15, and including a projection formed on said closed end wall of the canister for engaging a latch member of said developer unit into which said canister is to be fitted.

18. A toner supply container according to claim 13, wherein said abutment means comprise at least three equiangularly spaced eccentric drive teeth each extending radially of said extractor member on one face thereof.

19. A toner supply container according to claim 18, wherein there are six said drive teeth equiangularly disposed around the periphery of said extractor member, and each of said drive teeth has a radially outer edge in contact with the inner cylindrical wall surface of said canister.

20. A toner supply container according to claim 13, 14 or 15 and including a cover on said open end of the canister.

21. In or for a dry toner electrostatic image developer unit, a toner supply container comprising (a) a cylindrical canister which has a closed end wall; and an open end opposite said closed end wall;

(b) an extractor member mounted within the canister and able both to rotate freely about the longitudinal axis of the canister and also to execute, independently of its rotation, a translational movement along the canister from said open end to said closed end; said extractor member having a first side facing towards said closing end wall and a second side facing towards said open end of the canister;

(c) a mass of thermoplastic fusible toner material between said first side of said extractor member and said closed end wall of the canister;

(d) an extractor blade carried by said extractor member and projecting from said first side of said extractor member to sweep said mass of toner material during rotation of the extractor member;

(e) at least three drive teeth projecting from said second side of said extractor member for engaging drive dog means spaced from the center of a rotary drive member inserted in the open end of the canister and arranged to sweep the inner cylindrical wall of said canister; and (f) a plurality of additional teeth formed peripherally of said drive member and extending axially from said first side thereof, said additional teeth being arranged to be in sweeping contact with the inner cylindrical wall of said canister, said additional teeth being smaller than said drive teeth.

22. A toner supply container according to claim 21, wherein there are several of said extractor blades, each extending radially along a respective one of a set of equiangularly disposed radii, and each arranged to sweep, during rotation of said extractor member, a respective one of a set of annular zones of different radial extent throughout said canister.

* * * * *

UNITED STATES PATENT AND TRADEMARK OFFICE
CERTIFICATE OF CORRECTION

PATENT NO. : 4,203,533

DATED : May 20, 1980

INVENTOR(S) : Karl Gustav ZEUTHEN

It is certified that error appears in the above—identified patent and that said Letters Patent is hereby corrected as shown below:

In Section [73], after "Assignee", change "Rex-Rotary International/A.S." to --Rex-Rotary International Corporation A.S.--

Signed and Sealed this

*Fourth* Day of *November 1980*

[SEAL]

*Attest:*

SIDNEY A. DIAMOND

*Attesting Officer* *Commissioner of Patents and Trademarks*